April 14, 1942.  F. C. WALLACE  2,279,357
PIN CASE
Filed June 2, 1939
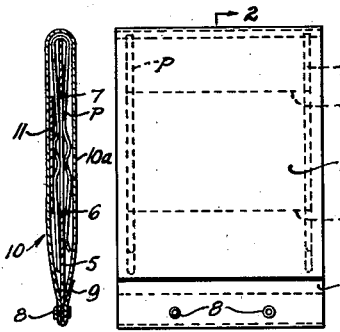
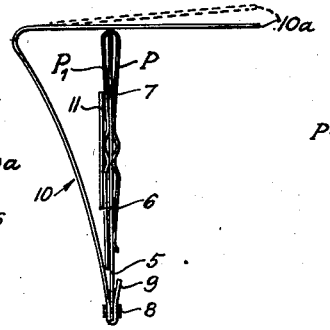
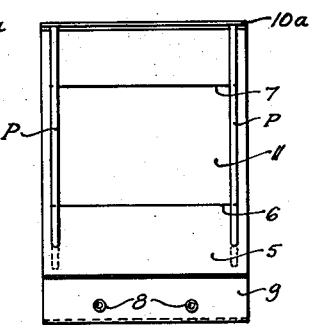
Fig. 2.  Fig. 1.  Fig. 3.  Fig. 4.
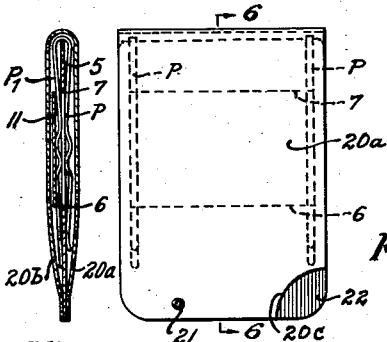
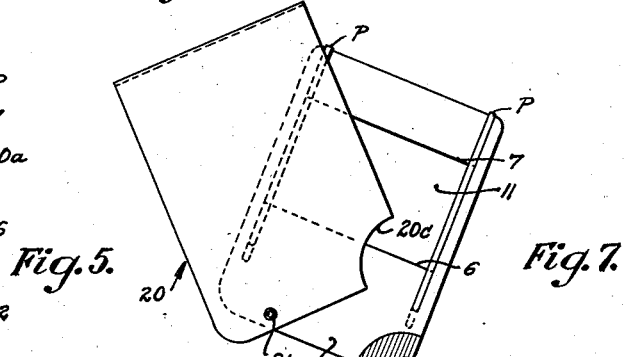
Fig. 6.  Fig. 5.  Fig. 7.
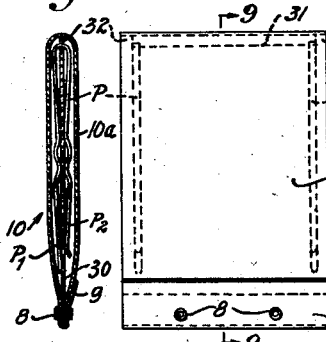
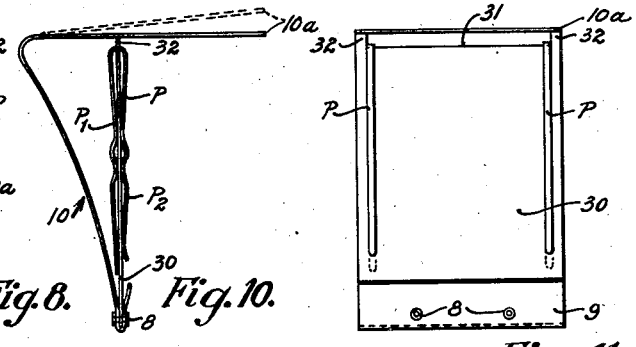
Fig. 9.  Fig. 8.  Fig. 10.  Fig. 11.
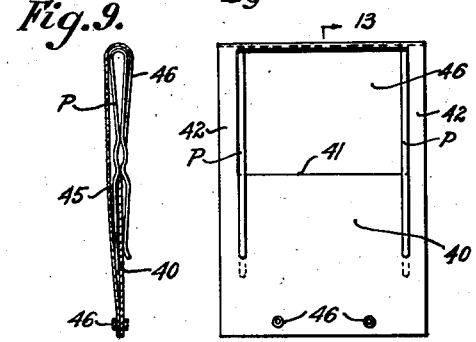
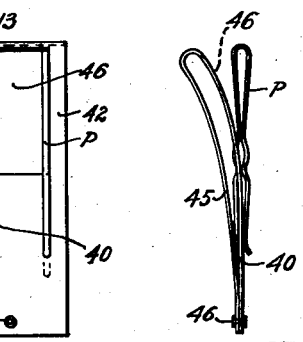
Fig. 13.  Fig. 12.  Fig. 14.
Inventor.
Frank C. Wallace.
Attorney.

Patented Apr. 14, 1942

2,279,357

UNITED STATES PATENT OFFICE 2,279,357

PIN CASE

Frank C. Wallace, Los Angeles, Calif., assignor to Hollywood Comb Curler Inc., Los Angeles, Calif., a corporation of California Application June 2, 1939, Serial No. 276,945

1 Claim. (Cl. 206—66)

My invention has to do with pin carrying devices and, more particularly, to book-like cases for carrying hairpins and the like.

Among the principal objects of my invention, I aim to provide a device in which the pins are securely held in position and protected from exposure until they are desired to be used and from which the pins may be easily removed when desired.

Another object is the provision of a pin carrying case of the book type in which the cover member has a transparent portion whereby the contents of the book may be visible without opening the book.

Another object is the provision of a pin carrying case which is economical of manufacture, which is durable and which is extremely convenient of use.

Other objects and accomplishments will become obvious from the following detailed description, for which purpose I refer to the accompanying drawing, in which:

Fig. 1 is a front view;

Fig. 2 is a section on line 2—2 of Fig. 1;

Fig. 3 is a side view of the device in partially open position;

Fig. 4 is a front view of Fig. 3;

Fig. 5 is a front view of a variational form of device in closed position;

Fig. 6 is a section on line 6—6 of Fig. 5;

Fig. 7 is a front view of the device of Fig. 5 in open position;

Fig. 8 is a front view of a variational form of device in closed position;

Fig. 9 is a section on line 9—9 of Fig. 8;

Fig. 10 is a side view of the device of Fig. 8 in partially open position;

Fig. 11 is a front view of the device in the position of Fig. 10;

Fig. 12 is a front view of a further variational form of device;

Fig. 13 is a section on line 13—13 of Fig. 12; and

Fig. 14 is a side view of the device of Fig. 12 in open position.

In the drawing (Figs. 1 to 4, inclusive), the numeral 5 designates a pin supporting sheet provided with transverse parallel spaced slits 6 and 7, each of which slits stops short of the side edges of the sheet. Sheet 5 is secured by suitable rivets 8 within the socket provided by the bottom upturned flange portion 9 of the cover member 10, which cover member is preferably made of flexible transparent material such, for instance, as a heavy grade of Celluloid. Pin supporting sheet 5 is also preferably, though not necessarily, of similar material. Pins P are mounted on the pin supporting sheet 5 by having one leg $P_1$ inserted through both slits 6 and 7 so that the medial, partial severed, portion 11 of sheet 5 compresses pin leg $P_1$ against the face of sheet 5 to secure it against accidental longitudinal escape from the sheet, the ends of the slits 6 and 7 providing stops to hold the pins against escape in a direction longitudinally of the slits. Slits 6 and 7 are so spaced from each other and from the top and bottom edges of sheet 5 that when a "Bobby" pin, for instance, is mounted on the sheet, the undulated portions of the pin legs rest between the slits to further secure the pin against accidental longitudinal escape from the supporting sheet. When in closed position (Figs. 1 and 2) the front cover portion 10a of the cover sheet is inserted between the flange 9 and the base of sheet 5.

In the variational form of Figs. 5 to 7, inclusive, the supporting sheet 5 is similar to that before described. However, it is pivotally mounted, by means of rivet 21, between the opposite sheets 20a, 20b of the cover member 20, the rivet passing through sheets 20a, 20b and through supporting sheet 5 at a point adjacent the lower left-hand corner spaced from the left-hand edge to permit the sheet 5 to swing outwardly (as shown in Fig. 7) in position to permit easy access to the pins P. The lower right-hand corner of each of the cover sheets 20a, 20b is cut away as at 20c to expose a finger gripping portion 22 of sheet 5, said portion 22 preferably being distinctively colored so that it might be easily located.

In Figs. 8 to 11, inclusive, I show a variational form in which the cover sheet is the same as described in connection with Figs. 1 to 4, inclusive. However, in this variational form the supporting sheet 30, instead of being slitted as before described, is cut away at its top edge between its side edges, as shown at 31. Thus the sheet 30 is confined between the opposite legs $P_1$ and $P_2$ of the pins, and the upwardly projecting ears 32 prevent the pins from moving over the side edges of the supporting sheet.

In Figs. 12 to 14, inclusive, I show a further variational form of device. Here the supporting sheet 40 is similar to that shown in Figs. 8 to 11, inclusive, except that the cut away portion 41 is deeper to provide longer side ears 42. The cover sheet 45 has its front portion cut away to provide a window 46 through which the pins P are accessible. When it is desired to insert to remove a pin, the cover sheet 45 is bowed backwardly (see Fig. 14), which leaves the supporting sheet 40 and its carried pins easily accessible.

The supporting sheet 40 is secured at its bottom between the front and back sheets of cover member 45 by suitable rivets 46.

The cover sheets and pins supporting sheets of the device of Figs. 5 to 14, inclusive, are also preferably composed of some relatively heavy grade of flexible, transparent material such as Celluloid, for the purposes before described.

The foregoing description is merely illustrative and not restrictive, inasmuch as my invention may be embodied in other specific forms without departing from the spirit or essential characteristics thereof.

I claim:

A package of U-shaped bobby pins, comprising a case having front and back cover members, a flexible plate mounted between the cover members, a plurality of U-shaped bobby pins mounted astride said flexible plate in abutting side by side relationship and a pair of spaced, straight, parallel elongated slits in the plate each extending continuously from adjacent one edge to adjacent the opposite edge of the plate, providing between said slits a rectangular flexible plate portion, said last mentioned plate portion being bowed out of the plane of the flexible plate and lying to one side of the bobby pins and bearing against one leg of each pin and thereby, in conjunction with the adjacent plate portions, yieldably holding the pins against escape therefrom.

FRANK C. WALLACE.